United States Patent Office 2,701,801
Patented Feb. 8, 1955

2,701,801

N-SUBSTITUTED DIAMINO ANTHRAQUINONE DICARBOXIMIDE DYES

Samuel N. Boyd, Jr., Salem, N. J., assignor to E. I. du Pont de Nemours and Company, Wilmington, Del., a corporation of Delaware No Drawing. Application October 9, 1953,
Serial No. 385,302

2 Claims. (Cl. 260—326)

This invention relates to the preparation of anthraquinone dyes, and more particularly to the preparation of cationic anthraquinone dyes which color "Orlon" acrylic fibers in blue shades having extremely high light fastness. The invention relates more particularly to cationic anthraquinone blue dyes which are alkyl ammonium salts of N-substituted 1,4-diamino-2,3-anthraquinone dicarboximides, which may also be referred to as alkyl ammonium salts of 2-(aminoalkyl)-4,11-diaminoanthra[2,3-c]pyrrol-1,3,5,10-tetrones having the general formula:

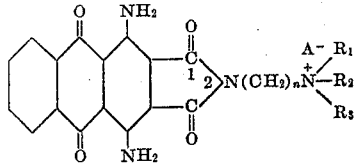

in which $R_1$ and $R_2$ are alkyl groups, $R_3$ is a member of the group consisting of alkyl and aralkyl groups, $n$ stands for an integer of the group consisting of 2 and 3, and $A^-$ stands for an anion of the group consisting of organic or inorganic ions, in which formula the alkyl groups contain from 1 to 4 carbon atoms and the aryl radical of the aralkyl group is of the benzene series.

It is an object of the present invention to prepare new blue dyes which are particularly useful in the dyeing of "Orlon" acrylic fibers in shades which are extremely fast to light and which may be applied to polyacrylonitrile fibers directly from an aqueous bath. A still further object of the invention is to provide a blue dye for polyacrylonitrile fibers which will be particularly suitable for application to polyacrylonitrile-viscose union goods.

The 2-(omega-dialkylaminoalkyl)-4,11-diaminoanthra-[2,3-c]pyrrol-1,3,5,10-tetrones employed as the starting materials in the preparation of the dyes of the present application are disclosed and claimed in co-pending application Serial No. 385,303 filed of even date herewith.

The following examples are given to illustrate the invention. The parts used are by weight.

Example 1

Ten (10) parts of 2-(3-dimethylaminopropyl)-4,11-diaminoanthra[2,3-c]pyrrol-1,3,5,10-tetrone in 300 parts of ortho-dichlorobenzene are agitated and dissolved by heating to 150 C. for 10 minutes, then cooled to 60° C. To this solution, 5 parts of dimethyl sulfate are added and the resultant mixture is agitated at 60° C. for 45 minutes. After cooling to 25° C., the reaction mass is filtered and the solid product washed with anhydrous acetone and dried. The dry product obtained is soluble in water to give a green-blue solution. It dyes polyacrylonitrile fibers bright greenish-blue shades. It is considered as having the formula:

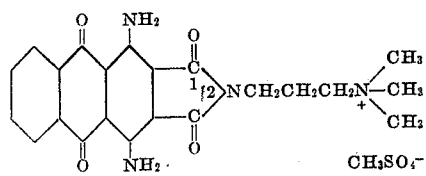

Using the same procedure, similar blue dyes for polyacrylonitrile fibers are obtained by the quaternization of 2-(2-dimethylaminoethyl)- and 2-(2-diethylaminoethyl)-4,11-diaminoanthra[2,3-c]pyrrol-1,3,5,10-tetrones with dimethyl sulfate.

Example 2

To 5 parts of 2-(2-dimethylaminoethyl)-4,11-diaminoanthra[2,3-c]pyrrol-1,3,5,10-tetrone in 150 parts of orthodichlorobenzene is added, with agitation, 3 parts of diethyl sulfate, and the resulting mixture heated to 150° C. for one hour. After cooling to 25° C., the reaction mass is filtered and the solid obtained is washed with anhydrous acetone and dried. The dry product obtained is soluble in water to give a green-blue solution. It dyes polyacrylonitrile fibers bright greenish-blue shades from a dilute acid or neutral bath. It is considered as having the formula:

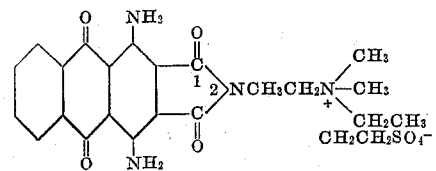

Using the same procedure, blue dyes for polyacrylonitrile fibers are obtained by the quaternization of 2-(2-diethylaminoethyl)- and 2-(3-dimethylaminopropyl)-4,11-diaminoanthra[2,3-c]pyrrol-1,3,5,10-tetrones with diethyl sulfate.

Example 3

To 10 parts of 2-(3-dimethylaminopropyl)-4,11-diaminoanthra[2,3-c]pyrrol-1,3,5,10-tetrone in 300 parts of orthodichlorobenzene is added 11 parts of benzylchloride and the resulting mixture heated to 150° C. for one hour. After cooling to 25° C., the reaction mass is filtered and the solid obtained is washed with anhydrous acetone and dried. The dry product is soluble in water to give a green-blue solution. It dyes polyacrylonitrile fibers bright greenish-blue shades from a neutral or dilute acid bath. It is considered as having the formula:

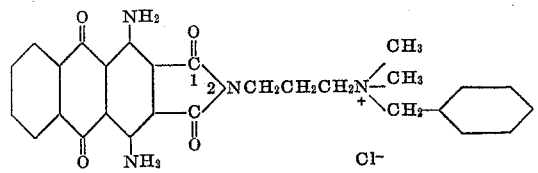

Using the same procedure, blue dyes for polyacrylonitrile fibers are obtained by the quaternization of 2-(2-dimethylaminoethyl)- and 2-(2-diethylaminoethyl)-4,11-diaminoanthra[2,3-c]pyrrol-1,3,5,10-tetrones with benzylchloride. The p-methylbenzyl chloride or the

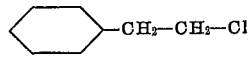

may be substituted for the benzyl chloride of this example.

Any organic solvent having a boiling point above or in the region of the desired reaction temperature and which is inert under the conditions of the reaction, may be substituted for the ortho-dichlorobenzene used in the specific examples. Among the solvents that may be employed may be mentioned nitrobenzene, trichlorobenzene, monochlorobenzene, xylenes, benzene, toluene, "Cellosolve," etc.

The amount of solvent employed is not critical, and the particular amounts specified in the specific examples are used merely to illustrate a satisfactorily operable process. The starting material is preferably soluble in the solvent employed, and the final dye is less soluble in these organic solvents.

The temperatures used in carrying out the reaction may be varied widely, as illustrated in the examples. The quaternization has been found to take place at temperatures as low as room temperature. The upper temperature limit is not critical except that it should not be so high as to cause reactivity of the alkylating agent with the primary amino groups on the anthraquinone nucleus. The dimethyl sulfate is the preferred quaternizing agent since it appears to be most reactive. The completeness of the reaction is readily determined by either chromatographic technique or by water solubility test. The quaternized products are water soluble. While the compounds of the present invention have been limited in the length of the side chain to 2 or 3 carbon atoms, this limitation has been included merely because the lower alkyl compounds are more practical because of the present availability of the intermediates required in the production of this type of compound.

Dipropyl and dibutyl sulfates may be substituted for the diethyl and dimethyl sulfates in the above examples to give compounds having substantially the same properties. The short chain alkyl chlorides and bromides containing up to 4 carbon atoms may be employed as quaternizing agents in this invention. The halides which are liquid at temperatures of the reaction are preferred. Esters of organic sulfonic acids, such as methyl and ethyl esters of p-toluene sulfonic acid, may also be employed.

The dyes of this invention are particularly useful in the dyeing of "Orlon" acrylic fiber in blue shades of extremely high light fastness, being rated better than 8 on the standard fastness scale (no break at 320 hours). These dyes have the advantage over acid wool dyes for this particular fiber since they do not require the copper ion technique for their application in heavy shades. The wash fastness of these colors on polyacrylonitrile fibers is similar to that of other basic dyes on the same fiber, being from about 3 to 4 on the standard scale of 1 to 5.

While it is generally believed that the affinity of these colors for polyacrylonitrile fibers is due to an ion exchange mechanism, the invention is not to be limited to this particular theory of affinity between dye and fibers.

These new dyes are applied to the polyacrylonitrile fiber from either neutral or acid baths. When polyacrylonitrile-viscose unions are dyed at a pH of from 7 to 9, the viscose remains uncolored.

I claim:

1. Compounds of the formula:

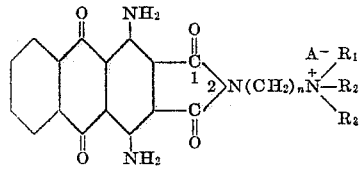

in which $R_1$ and $R_2$ are alkyl groups, $R_3$ is a member of the group consisting of alkyl and aralkyl groups, $n$ stands for an integer of the group consisting of 2 and 3, and $A^-$ stands for an anion of the group consisting of organic and inorganic anions, in which the alkyl groups designated above contain from 1 to 4 carbon atoms and the aryl radical of the aralkyl group is of the benzene series.

2. The compound of the formula:

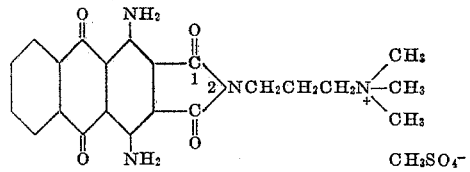

No references cited.